No. 846,350. PATENTED MAR. 5, 1907.
W. F. ROTHE.
FRICTION CLUTCH.
APPLICATION FILED DEC. 11, 1905.
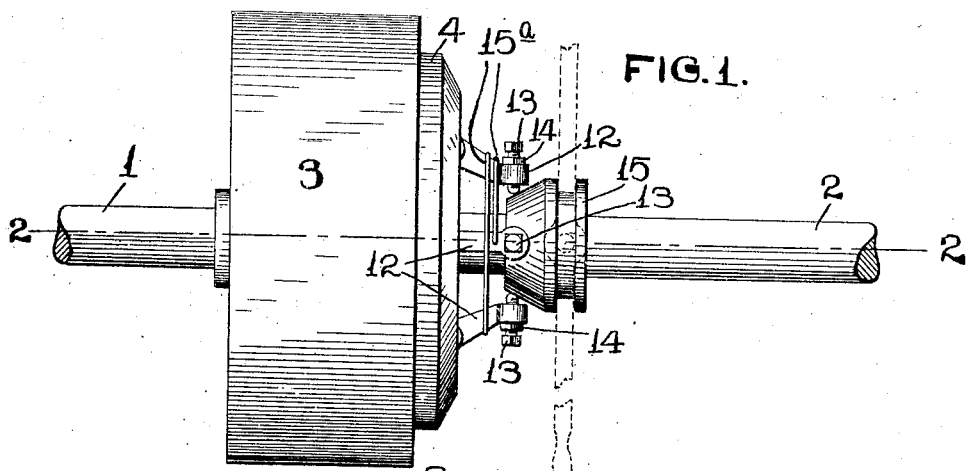
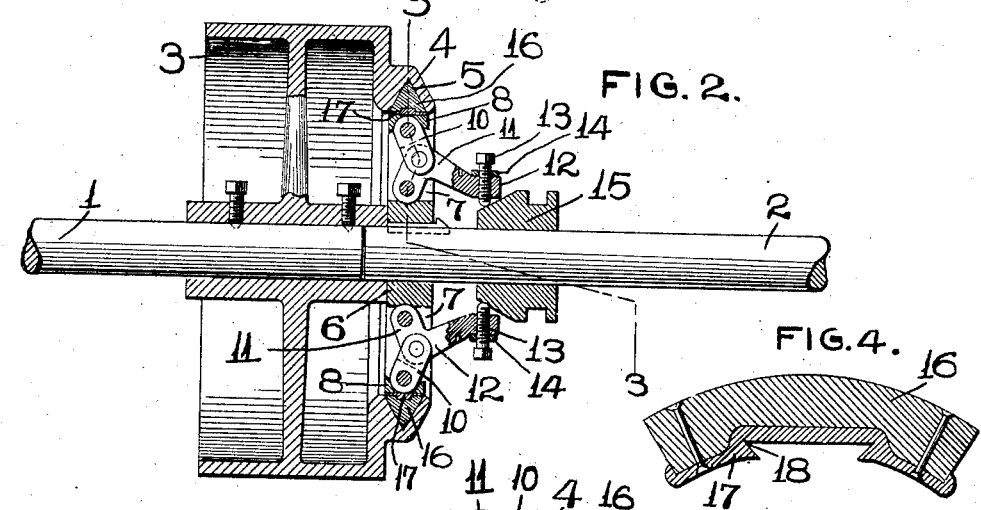
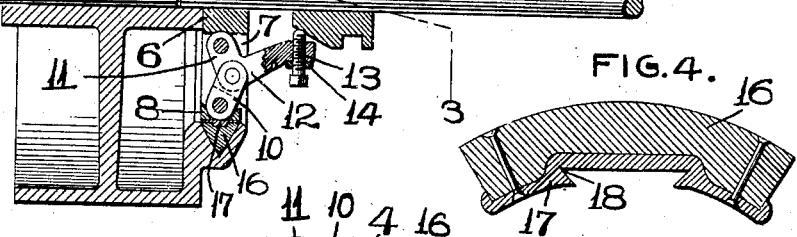
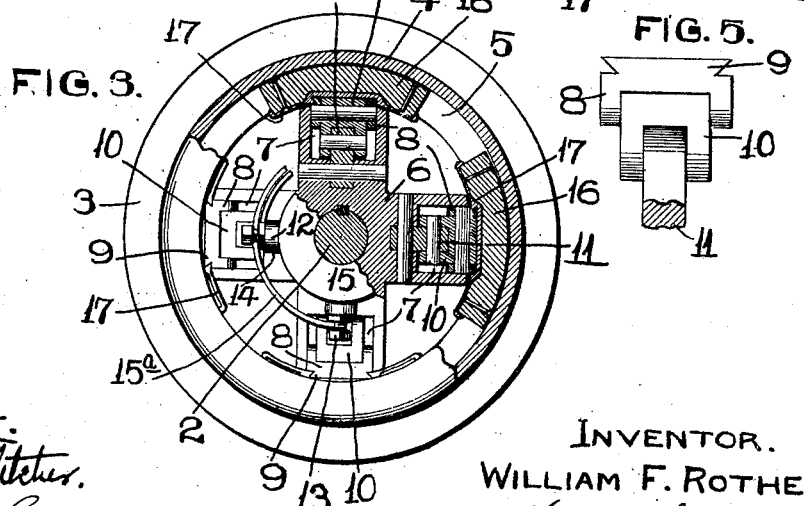
ATTEST.
H. J. Fletcher.
M. F. Smith
INVENTOR.
WILLIAM F. ROTHE.
BY Higdon & Longan,
ATTY'S.

UNITED STATES PATENT OFFICE.

WILLIAM F. ROTHE, OF EAST ST. LOUIS, ILLINOIS.

FRICTION-CLUTCH.

No. 846,350.      Specification of Letters Patent.      Patented March 5, 1907.

Application filed December 11, 1905. Serial No. 291,267.

*To all whom it may concern:*

Be it known that I, WILLIAM F. ROTHE, a citizen of the United States, and a resident of East St. Louis, Illinois, have invented certain new and useful Improvements in Friction-Clutches, of which the following is a specification containing a full, clear, and exact description, reference being had to the accompanying drawings, forming a part hereof.

My invention relates to a friction-clutch, particularly adapted for shaft-couplings or for any point where it is desired to transmit rotary motion from one shaft to another, which shafts are in alinement.

The object of my invention is to construct a simple, inexpensive, and easily-operated friction-clutch which may be readily assembled for use or taken apart for repairs.

My invention consists in certain novel features of construction and arrangement of parts which will be hereinafter more fully set forth, pointed out in my claim, and illustrated in the accompanying drawings, in which—

Figure 1 is a side elevation of my improved clutch in position upon the adjacent ends of a pair of shafts. Fig. 2 is a vertical section taken on the line 2 2 of Fig. 1. Fig. 3 is a transverse section taken on the line 3 3 of Fig. 2. Fig. 4 is a longitudinal section of one of the friction-blocks I make use of in carrying out my invention, and Fig. 5 is a side elevation of a slide-block that is detachably secured to the friction-block and which actuates the same.

Referring by numerals to the accompanying drawings, 1 indicates a driving-shaft, and 2 the driven shaft. Fixed upon the driving-shaft 1 is a pulley 3, which is provided on one side with an extension 4, in which is formed a continuous V-shaped groove 5. In some instances this groove might be formed in a rotating part of an engine, dynamo, or driven gear.

Keyed onto the driven shaft is a spider 6, the outer ends of the arms of which are bifurcated, as indicated by 7. Arranged to slide to and from the driven shaft in each bifurcated arm of the spider is a block 8, that is provided on its outer end with a dovetailed lug 9. Pivotally secured to the inner end of each block 8 is a short link 10, and pivotally secured to the inner end of each link is the center of a bell-crank lever 11, and the inner end of each bell-crank lever is pivotally secured to the spider 6, adjacent the central portion thereof. The longer arms 12 of the bell-cranks extend outwardly from the spider 6, and passing through their outer ends are screw-bolts 13, which are each provided with lock-nuts 14. These screw-bolts are arranged so that they all project toward the shaft 2, and their inner ends normally engage upon the periphery of a cone 15, that is arranged to slide upon the driven shaft 2. This cone may be manipulated in any suitable manner. Surrounding all of the arms 12 of the bell-cranks just inside the screw-bolts 13 are leaf-springs $15^a$, the tendency of which is to draw the free ends of the bell-cranks together and to maintain the points of the screw-bolts upon the periphery of the cone 15.

The pivot-points between the links 10 and the bell-cranks 11 are slightly out of alinement with the pivot-points of the links 10 with the blocks 8 and the pivot-points of the bell-cranks with the spider 6, which arrangement is necessary in order to cause the blocks 8 to move outwardly when the outer ends of the arms 12 of the bell-cranks are moved outwardly by the movement of the cone 15.

16 designates friction-blocks triangular in cross-section and curved longitudinally in order to fit in the groove 5, and fixed on the base of each block is a plate 17, provided with a transverse dovetailed groove 18 of such size as to receive the dovetailed lug 9 of the corresponding block 8. These friction-blocks are preferably constructed of hard wood or analogous material that will create friction while under pressure.

The various parts of my improved clutch are assembled as shown in Figs. 2 and 3, and while said clutch is not in action the driving-shaft rotates in the usual manner, and the friction-blocks are not engaged against the surfaces of the V-shaped groove 5, owing to the action of the springs $15^a$, which draw the arms 12 of the bell-cranks together, and consequently draw the friction-blocks 16 to their limit of movement toward the driven shaft 2.

When it is desired to throw the clutch into operation to impart rotary motion to the driven shaft, the cone 15 is moved toward the spider 6, and in so doing the inner ends of the screw-bolts 13 are engaged, and by so doing the ends of the arms 12 are moved outwardly, and this action necessarily moves the pivot-points of the bell-cranks, with the links 10, inwardly a slight distance, and said links are consequently moved outwardly, and the slide-blocks 8, to which the outer ends of said links are pivoted, will be moved outwardly, thus forcing the blocks 16 into frictional engagement with the surfaces of the V-shaped groove 5. As soon as the friction thus created reaches a certain point the friction-blocks 16, spider 6, and parts carried thereby will rotate with the driving-shaft 1, and as a result the driving-shaft 2 will be correspondingly driven. This result is maintained as long as the cone is held in its set position to hold the ends of the arms 12 outwardly, and when said cone is slid backwardly away from the ends of the arms 12 the springs 15$^a$ will move the ends of said arms 12 inwardly, and thus draw the friction-blocks away from the surfaces of the groove 5.

The dovetailed connection between the friction-blocks 16 and slide-blocks 8 allows said friction-blocks to be readily removed in order that they can be renewed after becoming worn from use.

The set-screws 13 permit adjustment between the bell-cranks and the cone, and this adjustment controls the distance of movement of the friction-blocks 16.

I have shown and described a cone for operating the outer ends of the bell-cranks 12; but other devices may be employed for imparting an outward movement to the ends of said bell-cranks.

It will be readily understood how the clutch might be mounted upon the driving-shaft 1 and impart rotary motion to a pulley or gear-wheel mounted upon the driven shaft.

My improved construction is simple, strong, and durable, is easily operated, repaired, and adjusted, and the peculiar shape of the groove, together with the friction-blocks, permits of a maximum amount of friction where compactness is essential.

I claim—

In a friction-clutch, a rotating member provided in one face with a V-shaped groove, a shaft, a spider fixed thereon, blocks arranged to slide in the outer ends of the arms of the spider, the outer ends of which blocks are dovetailed, friction-blocks engaging in the V-shaped groove, and plates fitted to the inner faces of the friction-blocks, in which plates are formed dovetailed grooves which receive the dovetailed ends of the sliding blocks; substantially as specified.

In testimony whereof I have signed my name to this specification in presence of two subscribing witnesses.

WILLIAM F. ROTHE.

Witnesses:
M. P. SMITH,
E. M. HARRINGTON.